March 22, 1932.  L. HEZARD  1,850,876
SHOCK ABSORBER FOR MOTOR VEHICLES
Filed Nov. 30, 1929  3 Sheets-Sheet 1
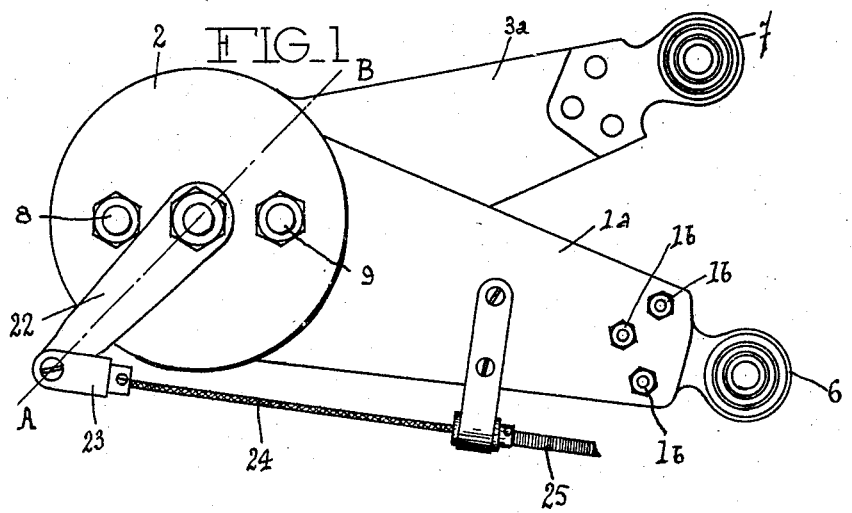
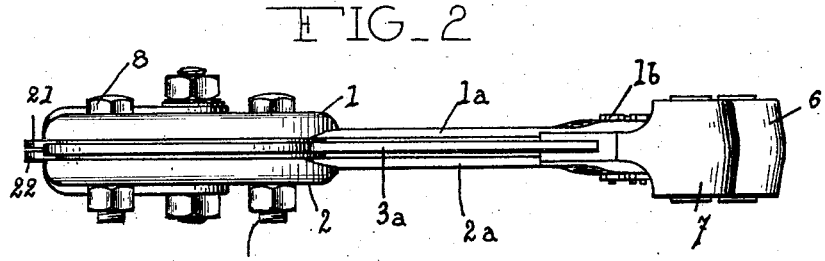
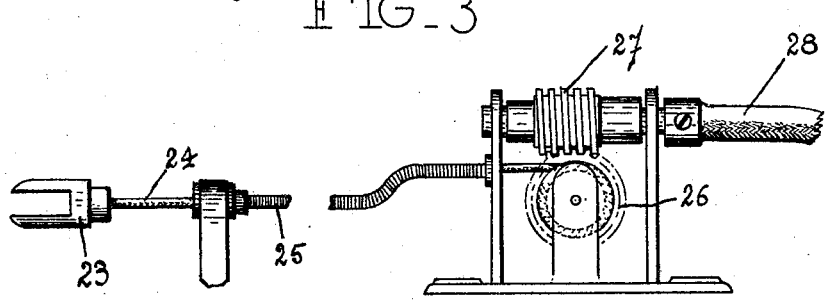
INVENTOR.
Louis Hezard
By William C. Luton
Attorney.

March 22, 1932.  L. HEZARD  1,850,876
SHOCK ABSORBER FOR MOTOR VEHICLES
Filed Nov. 30, 1929   3 Sheets-Sheet 2
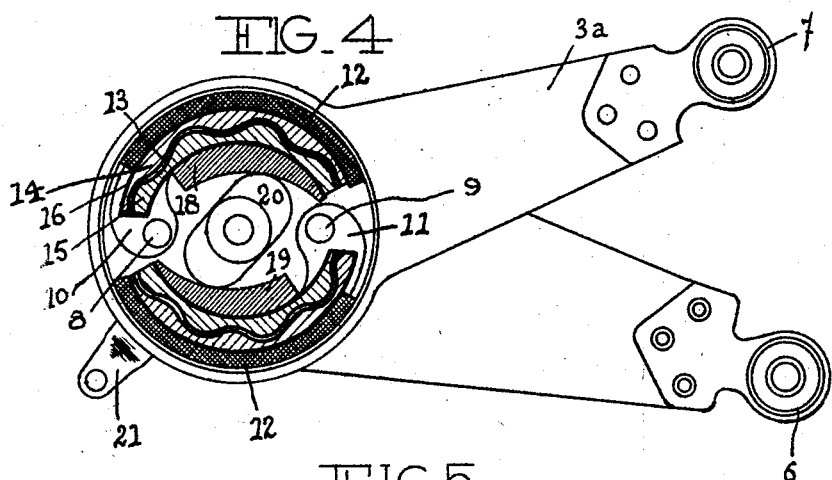
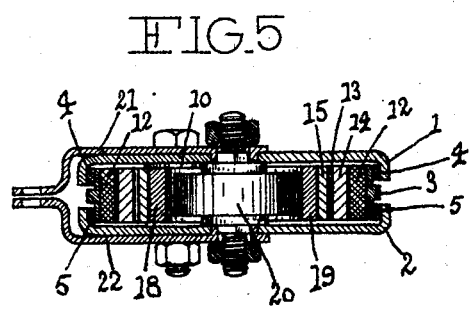
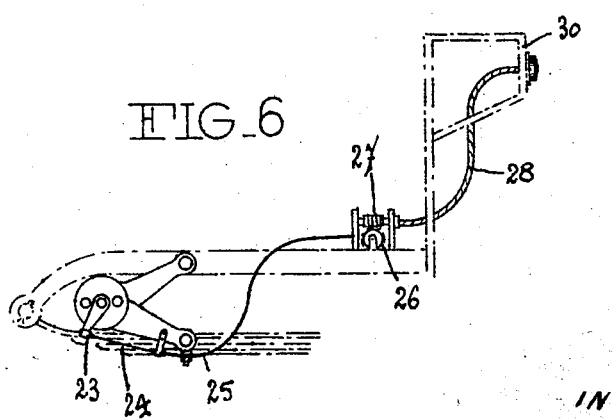
INVENTOR
Louis Hezard
By William C. Linton
Attorney March 22, 1932.  L. HEZARD  1,850,876
SHOCK ABSORBER FOR MOTOR VEHICLES
Filed Nov. 30, 1929  3 Sheets-Sheet 3
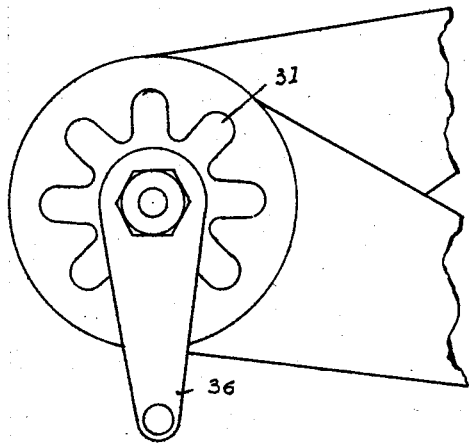
FIG_7
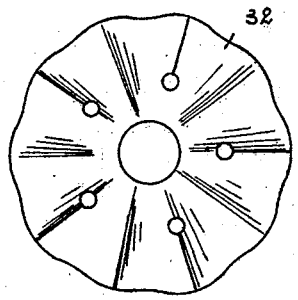
FIG_8
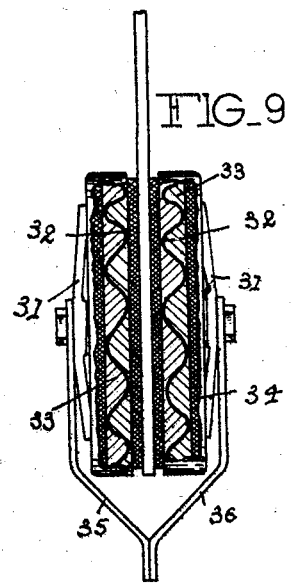
FIG_9
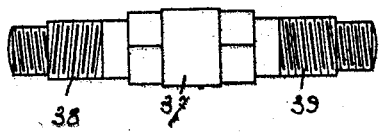
FIG_10
INVENTOR.
Louis Hezard
By William C. Linton
Attorney.

Patented Mar. 22, 1932

1,850,876

UNITED STATES PATENT OFFICE

LOUIS HEZARD, OF PARIS, FRANCE, ASSIGNOR TO LEOPOLD TRESCARTES, OF ESSONNES, SEINE-ET-OISE, FRANCE

SHOCK ABSORBER FOR MOTOR VEHICLES

Application filed November 30, 1929, Serial No. 410,793, and in France December 20, 1928.

My invention relates to a shock absorber intended to damp the oscillations of the suspension springs of a vehicle. There are in existence different types of shock absorbers, which operate to reduce these successive oscillations by braking the compression or expansion of the springs by friction means, resilient means, hydraulic means or the like.

The present shock absorber is of the friction type, of which there are many constructions in existence, some consisting of surfaces of special wood and the others of movable metallic members compressed to a greater or lesser extent by springs or other elements according to the severity of the shock absorbed by the plates or laminations of the spring of the vehicle. In most cases however these shock absorbers have the disadvantage that they require very careful maintenance as well as a definite degree of lubrication if effective results are to be obtained.

In many of the constructions wear necessitates the replacement of parts which are often very expensive. Water and mud often cause seizing which renders the vehicle springs substantially non-resilient. Finally in the majority of cases the adjustment of the shock absorber is predetermined and its tension cannot be modified according to circumstances.

The purpose of the shock absorber forming the object of the present invention is to obviate delicate parts or members which are expensive to manufacture. The wear sustained by the friction surfaces is reduced to a minimum and their replacement, should the need arise, does not entail much expense. The parts constituting this shock absorber are extremely simple and cheap to manufacture. The fact that no lubrication is required makes the maintenance of this apparatus easy. Its perfect tightness protects it against bad weather and mud, and consequently its efficacy remains constant. The very principle of this shock absorber prevents noise, considering that any play can only be produced by reason of wear.

The braking effect obtained with the new device is progressive, the spring remaining completely free during its travel, the shock absorber only coming into action when it returns, that is to say, during the sudden shocks.

One of the particular features of this shock absorber resides in the fact that its pressure can be regulated as desired according to the state of the road, from a distance even from the driver's seat. This regulation is effected by compressing the friction members to a greater or lesser extent which in its turn causes an increase or decrease in the resistance of the shock absorber.

In the appended drawings, which show one of the constructional forms used in carrying this invention into effect:

Fig. 1 is an elevation of the assembled shock absorber, showing the two arms and the remote control regulator, Fig. 2 is a plan view of the apparatus Fig. 3 shows the complete arrangement for the remote control of the variable compression system.

Fig. 4 is a side view, one of the cheeks being removed so as to show the internal mechanism.

Fig. 5 is a section of the apparatus according to line A B of Fig. 1,

Fig. 6 is a diagrammatic view of the complete assembly of the shock absorber and its control means on a chassis, Fig. 7 shows a modification of the invention, wherein the braking is by the friction between two surfaces.

Fig. 8 is an elevation of a circular undulated spring as used in the assembly according to Fig. 7.

Fig. 9 is a front elevation of the apparatus.

Fig. 10 is an elevation of the axle.

The shock absorbing mechanism is enclosed in a casing formed by two cheeks 1 and 2 and a central member 3 (Fig. 5). The casing is made water tight by means of washers or gaskets of cotton or felt 4 and 5 (Fig. 5) which are inserted between the cheeks 1 and 2 and the central member 3.

The cheeks 1 and 2 are extended by arms 1ª and 2ª (Fig. 2) which are connected together by means of bolts or rivets 1ᵇ (Figs. 1 and 2) and then terminate in a member 6 which is pivotally secured to the spring of the vehicle. The central member 3 is fitted with an arm 3ª which is terminated by a member 7 pivotally mounted on the vehicle chassis.

The cheeks 1 and 2 are rigidly fixed together by means of two bolts 8 and 9. So as to allow a complete locking of these bolts and to maintain the necessary distance, between the cheeks 1 and 2 so that they do not abut on the central member 3 and impede or stop the sliding movement, distance pieces 10, 11 of a special form are provided. These distance pieces serve in fact as supports for the two friction systems, each of which comprises a brake band 12, made of Ferrodo for instance, and an undulated spring 13 buried between two layers of rubber 14 and 15 held in position between two springs 16 and 17.

It is possible to compress the two friction systems more or less by means of the slippers 18 and 19 which are made of fibre or any other suitable substance, one side of which is of an inclined form upon which a cam 20 actuated and controlled by the levers 21 and 22 (Figs. 1 and 5) can mount more or less. These levers in their turn are actuated from the driver's seat by means of cables or a system of rods as is shown diagrammatically in Fig. 6. It is of course evident that when the cam 20 turns in the anti-clockwise direction it tends to separate the two slippers 18 and 19 and thus to compress the friction systems, and it consequently increases the braking effort of the two bands 12 against the interior wall of the central member 3.

The shock absorber functions as follows, viz:

When at rest the brake bands 12 are applied against the internal wall of the central member 3 by the spring unit constituted by the springs 16 and 17, the undulated spring 13 and the rubbers 14 and 15. This pressure exerted by the brake bands can be regulated according to requirements by rotating the cam 20 in one direction or the other.

When the members 7 and 6 tend to approach each other, that is to say, when the angle of the V formed by the arms or levers tends to decrease, the friction of the internal wall of the member 3 against the brake bands 12 tends to distend the spring unit and consequently to diminish the pressure of this spring arrangement against the wall. The shock absorber therefore does not resist the work of the spring. On the other hand, when the two pieces 6 and 7 tend to separate suddenly, which is equivalent to a sudden shock, that is to say when the angle of the V formed by the arms or levers increases the friction of the wall of the central or middle member 3 against the brake band tends to compress the spring unit, which however offers resistance, since it is supported by the fixed distance pieces 10 and 11, and the pressure of the brake band increases just as suddenly as the shock is intensive. The braking effect is instantaneous and attenuates the sudden reaction or return. This braking effect is the more powerful, the greater the initial velocity of the return movement.

In the device described there is no oscillating member and no movable member, all the work that the apparatus does being effected simply by the compression of springs or materials. The result thereof is an almost negligible wear limited to that of the friction band 12 which is easily replaced, as is the whole of the Ferrodo band of an ordinary brake of a vehicle for instance.

As the control of the cam 20 is effected by means of the exterior levers 21 and 22 it is possible to regulate from a remote point the pressure which is exerted by this cam on the friction band.

The control may especially be effected from the seat of the driver by means of system of cables and of a flexible transmission as shown in Fig. 3. The fork 23 is connected to the levers 21 and 22 and is controlled by means of a cable 24 within a sleeve 25 of the Bowden type. The extremity of the cable 24 can be fixed on a drum 26 controlled by a worm 27 which is actuated by means of a flexible transmission leading for instance, to the dash board 30 of the vehicle, well within the reach of the driver. The driver can therefore modify, according to the state of the road, the resistance of the shock absorber.

It is also possible to apply the principle which is the object of this invention to shock absorbers of the friction type in which two or more surfaces co-operate and are effective in both directions. Fig. 7 shows one of these shock absorbers, wherein an external star shaped spring 31 allows of compressing the internal discs to a greater or lesser extent. These internal discs are composed, as shown in Fig. 9, of undulated circular springs 32 (Fig. 8) buried in layers of rubber 33 held in position by means of the washers or gaskets 34 which support discs of the Ferrodo cotton type forming the braking surface. The thus constituted internal discs can be compressed more or less by the rotation in the one or other direction of the external controlling levers 35 and 36 (Fig. 9).

The whole, which consists of the discs, the levers, and the cheeks is mounted on a common shaft 37 shown in Fig. 10. The levers 35 and 36 are mounted on left and right hand screw-threads, so that their action is simultaneous, that is to say, that they compress or release the internal discs. These levers are controlled from a distance by a system of cables and of flexible transmissions as above described.

It will be understood that other methods or other constructional forms may be employed without exceeding the scope of this invention.

I claim:

1. A shock absorber comprising a pair of relatively spaced outer cheeks having internal friction surfaces, and flexible compressible braking members received between said cheeks and cooperating with the frictional surfaces of the latter, said braking members being formed of undulated spring means embedded in yieldable material.

2. A shock absorber comprising a pair of relatively spaced outer cheeks having internal friction surfaces, flexible compressible braking members received between said cheeks and cooperating with the frictional surfaces of the latter, said braking members being formed of undulated spring means embedded in yieldable material, and means for controlling the friction between said braking members and the friction surfaces of the cheeks.

3. A shock absorber comprising a pair of relatively spaced outer cheeks, a ring received between and disposed peripherally of said cheeks, said ring being mounted movably with respect to the cheeks, a pair of braking shoes fixed between said cheeks and frictionally engaging the adjacent inner surfaces of said ring, said shoes being formed of undulated spring means embedded in yieldable material.

4. A shock absorber comprising a pair of relatively spaced cheeks, a ring received between and disposed peripherally of said cheeks, said ring being mounted movably with respect to the cheeks, a pair of braking shoes positioned between said cheeks and frictionally engaging the adjacent inner surfaces of said ring, said shoes being formed of undulated spring means embedded in yieldable material, and clamping members fixing said shoes to the cheeks to prevent relative movement therebetween.

5. A shock absorber comprising a pair of relatively spaced outer cheeks, a ring received between and disposed peripherally of said cheeks, said ring being mounted movably with respect to the cheeks, a pair of braking shoes fixed between said cheeks and frictionally engaging the adjacent inner surfaces of said ring, said shoes being formed of undulated spring means embedded in yieldable material, and grippers associated with said shoes to act upon the undulated spring means thereof and apply frictional pressure between the shoes and ring.

6. A shock absorber comprising a pair of relatively spaced outer cheeks, a ring received between and disposed peripherally of said cheeks, said ring being mounted movably with respect to the cheeks, a pair of braking shoes fixed between said cheeks and frictionally engaging the adjacent inner surface of said ring, said shoes being formed of undulated spring means embedded in a yieldable material, and adjustable cam means acting upon said shoes to control the frictional engagement of the shoes with the ring.

In witness whereof I have hereunto set my hand.

LOUIS HEZARD.